United States Patent
Vidal

[15] 3,655,403
[45] Apr. 11, 1972

[54] TREATMENT OF FLOUR AND DOUGH

[72] Inventor: Frederick D. Vidal, Englewood Cliffs, N.J.

[73] Assignee: Pennwalt Corporation, Philadelphia, Pa.

[22] Filed: June 27, 1969

[21] Appl. No.: 837,344

[52] U.S. Cl. .................................................99/91, 99/93
[51] Int. Cl. ..............................................A21d 2/26
[58] Field of Search ..................99/91, 90 R, 90 CB, 14, 17, 99/93

[56] References Cited

UNITED STATES PATENTS

| | | | |
|---|---|---|---|
| 3,391,001 | 7/1968 | Sair | 99/17 |
| 2,434,087 | 1/1948 | Weber | 99/90 R |

*Primary Examiner*—Raymond N. Jones
*Assistant Examiner*—James R. Hoffman

[57] ABSTRACT

For the improvement of flour, dough and baked products, notably bread, a partial hydrolysate of edible protein, such as soya protein or wheat gluten, is prepared by acid hydrolyzing treatment which is controlled to limit the hydrolysis within a range short of completeness, and this hydrolysate product is incorporated with the flour, e.g., in dough mixtures. Such treatment of the flour provides improved properties, as in the dough and notably as to volume and texture of the resulting loaves or other products. The partial hydrolysate, useful in a wide range of proportions, is effective alone or in coaction with chemical-type improving agents, and can be formulated with finely-divided diluent to yield a pulverulent composition readily suitable for addition to or with flour, in making up dough.

20 Claims, No Drawings

TREATMENT OF FLOUR AND DOUGH

BACKGROUND OF THE INVENTION

This invention relates to procedures and compositions for the treatment of cereal milling products, and specifically for treating flour or dough used for making baked goods, to improve the bread-making or like properties of such flour and flour-containing materials. The flour or dough improving function achieved with this invention is of the general nature of that attained by the use of presently known improving agents, such as bromates, iodates, azodicarbonamide and the like, and being chiefly similar to a maturing action, it therefore can and will sometimes be so described herein. The function is, however, sufficiently and properly identified as an improving effect, meaning principally an improvement in the physical properties of the ultimate baked product notably with respect to such properties as volume, grain and texture, and softness, in comparison with identically made products lacking the improving agent.

In general, substances of this class heretofore employed, as mentioned above, have been chemicals, i.e., produced by synthesis or other conventional chemical procedure, and regardless of established evidence of safety in their use, considerable public reluctance has remained respecting the employment of chemicals as food additives or as ingredients in the making of bread and the like. The present invention, involving the discovery of hitherto unrecognized and highly advantageous properties in certain food-type materials, is therefore directed to the provision of a new and indeed superior flour and dough improving agent that is not of the class of reagent chemicals but is derived from or based upon naturally occurring products of recognized edibility such as to afford ready acceptance of the herein-described procedure and compositions in making baked goods. At the same time, the agent can be relatively inexpensive and therefore economically attractive.

A further object of the invention is to provide procedures and compositions for the stated purpose, namely the improvement of flour and its baking function, which have properties not generally available in existing agents. Thus for example, use of excessive quantities of most of the known maturing or oxidizing agents, including those mentioned above and others such as chlorine dioxide employed directly on flour as milled, may tend to result in over-treatment of flour or dough, with somewhat drastic results. Thus utilization of the present invention appears to have great tolerance in that the employment of even a substantial excess of the functioning product will not produce an over-matured effect. Additional aims are to provide conditioning of the dough in the sense of giving it better handling properties, as well as to achieve, in the resulting bread or the like, an improved volume, grain, texture, symmetry and overall appearance, as mentioned.

Some approach to the use of naturally occurring products has heretofore appeared in the employment or proposed employment of cysteine, cystine and methionine, individually, for dough improving or conditioning action, these being amino acids that can be derived from peptide-linked residues that are or may be present, along with residues of many other amino acids, in protein molecular chains. These specific compounds, however, are relatively expensive to prepare and their effects or dough-improving functions do not appear to have been of such nature or advantage as to result in any wide or extended use of these agents; indeed it is understood that in the practical operation of commercial bakeries factors of economics, convenience and efficiency have favored the presently common chemical additives or treatments.

Further objects and advantages of the invention will be indicated or will become apparent from the following description.

SUMMARY OF THE INVENTION

To the foregoing and other ends, it has now been discovered that in contrast with proteins themselves and indeed, as indicated below, in contrast with many amino acids that can presumably be made by hydrolysis and fractionation from proteins, a product can be prepared by controlled, partial hydrolysis of naturally-occurring proteins such as soya protein, wheat gluten, fish protein, meat protein and the like, which when used with flour or in dough exhibits a specific and substantial activity in improving the bread-making or similar properties of the flour or dough. This activity or potential of a partial hydrolysate of protein does not appear to have been heretofore known or suspected, and has been found to be peculiar to the partially hydrolyzed material as described below, in comparison with the unhydrolyzed protein or with products of complete hydrolysis that have been commonly prepared for other purposes but that exhibit no significant flour- or dough-improving function. Thus for example by subjecting soya protein to acid hydrolysis which is limited in extent in the sense that the hydrolyzing action is at least appreciably less than would be recognized as complete, the resulting product is found to constitute an effective improving agent of the sort contemplated in the discussion of the background of the invention, hereinabove.

Accordingly the present invention embraces procedures, which can be defined as for improving flour or for improving dough, that consist essentially in admixing the stated partial hydrolysate of protein with the flour, notably in such fashion that the product is or becomes present when the dough ingredients, including flour and water, are mixed together, i.e., at least so that the agent is distributed throughout the dough as or when it reaches its final state of mixing. The above-stated objects are found to be achieved in full measure, including improvement in the volume, grain, texture and other physical properties of the resulting bread, such advantages being thereby reached with a substance which is essentially of natural origin and readily recognized as having the safe, edible properties of a natural material.

As indicated above, many of the observed improving effects resemble those obtained with previously used maturing or oxidizing agents for flour and dough, and indeed the action can be described, with some propriety, as a maturing function, but it has not been established that the mechanism responsible for the improving activity with the present invention is the same as that involved in previously defined maturing action. Indeed as noted below there is some small increase of the improving effect if the original protein material, i.e., before the stated partial hydrolysis, is itself treated with maturing or oxidizing agents of the above-mentioned chemical types. Regardless of theory, the procedures and compositions of the invention have been found to afford marked betterment in dough and particularly the resulting baked product, in the respects noted, which may be characterized as a substantial improving action.

The product employed can be defined as a partial hydrolysate of protein, prepared by suitably controlled hydrolysis, the general procedures for hydrolyzing protein, usually to an end point of completion, being in themselves known. The presently preferred protein from the combined viewpoint of economics and activity of the final product is soya protein, one example being an available material containing about 50 percent protein, but agents with substantial activity can be prepared from other types or sources of protein, as for instance from the other edible proteins noted above. It is at present preferred, for economy, effectiveness and ready control, to utilize acid hydrolysis employing hydrochloric or other mineral acid, for example by refluxing the selected protein with acid of appropriate normality for a limited time, followed by filtration, neutralization if desired, and preferably drying the dissolved hydrolysate product to solid form. Other procedure can be employed, as by using any of a number of organic acids.

In carrying out the flour treating procedure, the partial protein hydrolysate, whether in original and preferably neutralized solution or advantageously in dry, finely divided form, is suitably introduced into the dough mixture, and thereafter becomes effective for the described results. The improving action is readily attained in conventional bread procedures, including the sponge dough and straight dough types, and continuous dough-mixing processes. While the action appears to be of slower nature, somewhat similar to bromate as contrasted with fast-acting improvers such as azodicarbonamide or iodate, the time of action afforded in continuous methods, e.g., in the proofing and baking steps, is ample.

The acid hydrolysate can be used directly as such or it may be neutralized with a variety of alkali sources, for instance ammonia, to yield corresponding salt forms of the partially hydrolyzed protein material, which are equally active. Particularly in that the neutralizing reaction simply affects the acidic character of the carboxyl groups in the hydrolysate, references to the protein hydrolysate, i.e., partial hydrolysate, or product of partial hydrolysis herein are intended generically to include the salt as well as the acid forms of the material, i.e., unless otherwise specifically indicated. For ease of handling and particularly for preparation of a composition that can best constitute an article of commerce and indeed that is believed to represent a new composition of matter, the acid or neutralized hydrolysate product resulting from the described methods of preparation can be formulated with suitable solid diluents to yield a free-flowing powder (the hydrolysate product itself being usually somewhat hygroscopic) that may contain, for example, from about 1 to about 75 percent of the material resulting from partial hydrolysis of a representative protein product mentioned below.

DETAILED DESCRIPTION

As stated, the invention comprises utilizing the described partial hydrolysate of protein by admixing it with flour, e.g., before or when the flour is made into bread dough (meaning yeast-leavened dough) or the like. In all other respects, the entire operation of bread making can be of known sort, with various usual steps, or such of them as required for the selected process, including mixing, developing, fermenting, dividing, proofing, and ultimate baking. The chief result of the operation with the stated agent is generally an improvement in the volume of the ultimate loaf and an improvement in other properties, particularly those commonly characterized as grain and texture, such improvements being at least substantially comparable to what is achieved with various well-known chemical agents.

As an example of known use of procedure for hydrolyzing protein, the complete hydrolysis of material such as soya protein has been employed to yield products intended as flavor additives. It has also been known or proposed to prepare a partially hydrolyzed protein product, e.g., a partial hydrolysate of soya protein, apparently indicated for like use as a source of flavor additive, but it has not heretofore been known that such partial hydrolysates in themselves could be made to constitute products which are characterized by flour or dough improving properties, nor does it appear that such hydrolysates have been proposed for use in treating flour or in making bread dough or the like. Although a few single amino acids have individually been found to exhibit some dough improving function at higher treatment levels than is herein involved, there has been no indication, nor any finding in tests mentioned below, of any such characteristic common to amino acids generally or to any number of them other than those few. Moreover, the untreated protein itself is of no effect as an improver at similar levels of treatment.

Further detail of the invention may best be explained by referring first to some specific examples, i.e., of the preparation of the partial hydrolysate and of its use for the treatment of flour, e.g., in bread dough.

In the first example a partial hydrolysate is prepared by refluxing soya protein with mineral acid of selected normality under conditions chosen, e.g., by simple test or from reference to the art, so that the desired partial rather than complete hydrolysis is achieved. Since the end point of hydrolysis is presumably a complete conversion of the polypeptides to amino acids, being the several individual acids corresponding to the many varieties of residues usually present in each protein chain, the extent of hydrolysis can be measured by analyzing the content of alpha-amino nitrogen in the product. Such nitrogen is that of the $NH_2$ groups associated in alpha relation to carboxyl groups (-COOH) in the manner of amino acids, and is thus a measure of the extent to which the peptide bonds have been broken. Alternatively the extent of hydrolysis for the given protein composition that is used may involve a simple titration procedure, e.g., with sodium hydroxide, which determines the carboxyl (acid) content, for instance as milliequivalents of sodium hydroxide per gram of product.

EXAMPLE I

In this example, the protein was a commercial soya product, having a protein content of 52 percent by weight. In appropriate apparatus, 1.25 pounds of such material and 3.96 pounds of 2N (i.e., 2-normal) hydrochloric acid were refluxed for 5 hours, the temperature thus being slightly over 100°C. At the end of this time the reaction liquor was filtered to remove insolubles (being a few percent, including the humin fraction) and was then evaporated to dryness in a rotating vacuum evaporator. The product was obtained in 90 percent yield as a somewhat hygroscopic yellow-brown solid, which could be used as such, or which, as explained further below, can be formulated with suitable diluents to give a free-flowing powder. The product of this example, upon analysis, showed an alpha-amino nitrogen content equal to about 40 percent of the total nitrogen, it being conveniently significant to express the alpha-amino nitrogen analysis by such ratio (in percent). In comparison complete hydrolysis of the soya protein showed alpha-amino nitrogen as approximately 67 percent of the total nitrogen, whereas in the untreated protein the ratio is less than 1 percent.

Although in the following examples the partial hydrolysate was usually employed in the acid form directly resulting from operation as above, the filtered solution can be neutralized to yield a salt form, e.g., an ammonium, sodium, other alkali metal or indeed any other appropriate salt, such salt formation being with respect to the carboxyl groups of the various fractions of the hydrolysate. The improving action appears to be the same, whether the product is employed in the acid or salt form, but some industrial advantage, in handling or otherwise, is conceived for the neutralized rather than acid product. One preferred method is to effect the neutralization with ammonium hydroxide, producing ammonium salts, as for example for avoiding any possible unwanted result respecting the flavor of the baked product.

In the following Examples II, III and IV, bread dough was prepared and baked, utilizing a partial hydrolysate produced as indicated in Example I. As will be understood, the agent may be added to the flour or to the dough, either at the time of make-up of the dough along with other ingredients, or indeed after mixing has begun; the results are beneficial in all cases and for convenience of description, general references to the treatment of flour with the hydrolysate product will be understood (unless otherwise indicated) to include all such procedures, it being further presently understood that the action of the improver does not occur until the flour is mixed with water. The improver appears to be effective under a wide variety of circumstances, i.e., for various dough formulations and types of bread, e.g., white and other loaves made wholly or largely with wheat flour.

For convenience, the various specific tests herein described were directed to making white bread in an otherwise conventional manner, employing dough formulations, and mixing and baking practice, of a standard character, equivalent to commercial usage for making white bread of good quality. The flours employed were representative of first quality (white) wheat flours utilized by bakers, and conventional bread dough ingredients, including yeast, salt and others, were used, with absorption selected in the range of 60 to 65 percent, meaning the proportion of water relative to the flour, by weight. Some tests were carried out to yield standard one pound loaves, and some were directed to produce smaller loaves as a matter of convenience but without affecting the significance of results. The volumes measured were the volume of the final baked loaf, in milliliters, and ratios or volume ratios represented the ratio of volume in milliliters to the weight of the loaf in grams, being a standard ratio for appraising loaf volume.

The loaves were also examined for texture, sometimes hereinbelow referred to as grain and texture, and a score was reached for evaluating such properties, i.e., as an average of all properties, including grain, texture, crumb color, crust color, break, shred and symmetry of form. This is an accepted method of scoring; more particularly, the mode of examination and resulting scoring was essentially as set forth in U.S. Pat. No. 2,903,361, granted Sept. 8, 1959 (Marks, Joiner and Parker), with reference to the description beginning in column 6, line 48 and extending through column 7, line 9.

EXAMPLE II

In this example batches of bread dough were made and processed by the sponge dough process, including preparation of the sponge, extended fermentation of same, mixing with further flour and water at the final dough-up, followed by conventional fermentation and other steps, e.g., including dividing, proofing and baking to yield one pound loaves. A control batch was made and baked with no improving agent; another batch, for comparison, was made with potassium bromate; and a third batch, employing the present invention, was made with the inclusion of the partial hydrolysate of soya protein as produced in accordance with Example I. The improving agents were respectively included in amounts (stated below) measured as parts per million (by weight) of the total flour, i.e., the flour used both for sponge and in final mixing. The agents were actually added at the time of mixing the sponge dough, but good results are also attainable when the hydrolysate is used only at the final dough-up, an alternative practice being to incorporate some at each mixing stage. The loaves for each batch were examined for volume, volume-to-weight ratio, and likewise for grain and texture properties, being scored in a standard fashion as explained above. The results are tabulated as follows:

| Material | Volume | Ratio | Score |
|---|---|---|---|
| Control | 2520 ml | 5.39 | 93.5 |
| Potassium Bromate, 10 ppm | 2640 ml | 5.75 | 95.5 |
| Soya Hydrolysate, 250 ppm | 2640 ml | 5.72 | 95.5 |

As will be seen the partial hydrolysate of the naturally occurring, edible soya protein gave fully as good results as the bromate, with significant improvement in loaf volume relative to the untreated control, while the grain and texture score was relatively high, indicating appreciable betterment in these desired properties of the bread. In this and other examples below, it will be understood that texture scores in the range of 92.5 to 93.5 are characteristic of good white bread made without improving or maturing agents in the dough and that in contrast scores ranging upwards from about 94.5, particularly in the region of 95 to 97 or better, constitute marked improvement in respect to characteristics such as grain, texture, break, shred and symmetry of form.

EXAMPLE III

Two sets of baking tests were run utilizing the straight dough method, i.e., wherein all dough ingredients are mixed together at once, including all of the flour and water, with full mixing time, the dough being then subjected to extended fermentation, and thereafter divided, proofed and baked. These tests employed two kinds of flour, as follows:

a. Using a so-called patent flour three batches were made and baked, as 1 pound loaves, being respectively a control batch without improver and further batches using potassium bromate and the partial hydrolysate of soya protein (from Example I) respectively in the amounts noted below. The following Table gives the results of the examination and scoring of the loaves of each batch, with excellent results obtained in all areas for the hydrolysate improver:

| Material | Volume | Ratio | Score |
|---|---|---|---|
| Control | 2520 ml | 5.48 | 93.5 |
| Potassium Bromate, 10 ppm | 2640 ml | 5.78 | 95.5 |
| Soya Hydrolysate, 100 ppm | 2630 ml | 5.80 | 96.0 | b. In this instance, three batches were processed by the straight dough method, using so-called clear flour, again respectively employing no agent, potassium bromate and the same soya partial hydrolysate, in concentrations as stated. The following results of examination and score of the baked loaves, being in this instance small 100 gram loaves (meaning, here and below, loaves from 100 grams of flour), showed the improving effectiveness of the partially hydrolyzed protein:

| Material | Volume | Ratio | Score |
|---|---|---|---|
| Control | 780 ml | 5.45 | 93.0 |
| Potassium Bromate, 15 ppm | 940 ml | 6.50 | 96.0 |
| Soya Hydrolysate, 1000 ppm | 885 ml | 6.13 | 96.0 |

EXAMPLE IV

Here the operations were performed to bake standard 1 pound loaves by a continuous-mixing process, utilizing a small-capacity Baker mixer. A non-flour-containing fermented broth was employed, and all ingredients, including the broth and the improving agents, were supplied to the mixer, which functioned to premix and develop the dough as will be understood. Four runs were made, being a control dough without improving agent, doughs respectively with potassium bromate and the partial hydrolysate of soya protein (in amounts noted), and a dough utilizing bromate and the partial hydrolysate together, from which the baked bread demonstrated not only the compatibility of the agents but their conjoint effect in yielding very superior improvement, particularly in grain and texture. The results of the examination of the loaves, which also evidenced the excellent adaptability of the hydrolysate product to continuous mixing, were as follows:

| Material | Volume | Ratio | Score |
|---|---|---|---|
| Control | 2160 | 5.0 | 93.0 |
| Potassium Bromate, 25 ppm | 2320 | 5.35 | 96.5 |
| Soya Hydrolysate, 1,000 ppm | 2430 | 5.35 | 98.0 |
| 25 ppm KBrO₃ + 750 ppm Soya Hydrolysate | 2480 | 5.48 | 99.5 |

Although soya protein is of unusual advantage for making the hydrolysate product, other proteins may be employed, particular examples being a variety of known and readily available, edible proteins, and mixtures of them. Tests have indicated some variation in activity of the partial hydrolysates, and different quantities of them appear desirable for best improving results, as derived from the different sources of protein. Wheat gluten yields a hydrolysate product of activity equivalent to that from soya protein, but may involve greater cost. Fish and meat proteins have somewhat lesser activity and varying costs.

EXAMPLE V

Tests were made of partial hydrolysates from various proteins, e.g., by following procedure essentially like that of Example I, wherein the protein preparation, usually of a commercially available type, was subjected to refluxing with 2-normal hydrochloric acid for three hours, and the resulting reaction liquor thereafter filtered and evaporated to yield a partial hydrolysate having a substantial content of alpha-amino nitrogen but significantly less than would be representative of complete hydrolysis. Batches of bread dough were made and processed by the straight dough method using a clear flour, and 100-gram loaves were baked. The results are tabulated as follows, including the dosage of the several partial hydrolysates in milligrams per 100 grams of flour. For brevity, the results of volume and texture examinations are given in summary as maturing effect.

| Material | Dosage | Maturing Effect |
|---|---|---|
| Gluten Hydrolysate | 100mg/100g flour | Good |
| Soya Hydrolysate | 200mg/100g flour | Good |
| Fish Meal Hydrolysate | 200mg/100g flour | Good |
| Corn Protein Hydrolysate | 300mg/100g flour | Fair-Good |
| Meat Protein Colloid Hydrolysate | 400mg/100g flour | Fair-Good |

Some other proteins were also tested, i.e., by conversion to partial hydrolysate, and thereafter employed in baking operations of the same sort. Thus the partial hydrolysate of lactalbumin used in amount of 150 mg. per 100 grams of flour afforded fair to good improving action. Lesser or perhaps minimal improving effect, although of some utility, was achieved with partial hydrolysates of casein and compressed yeast respectively employed in amounts of 250 mg. and 300 mg. per 100 grams of flour. Combinations of the partial hydrolysates were also tested, in baking bread, with the attainment of good maturing activity, as by the use of 50 milligrams each of the fish meal and gluten hydrolysates, or a combination of 150 milligrams soya hydrolysate and 40 milligrams gluten hydrolysate per 100 grams of flour.

EXAMPLE VI

In this instance gluten, e.g., as obtained from wheat flour, was hydrolyzed for three hours by reflux in 2N hydrochloric acid, using a weight ratio of three parts of HCl to one part of protein. The resulting partial hydrolysate product was analyzed as having an alpha-amino nitrogen to total nitrogen ratio of 34 percent. When tested by the straight dough method with clear flour, the maturing activity was found to be optimum at about 100 milligrams per 100 grams of flour and the maturing or improving effect in the baked loaves was rated as good.

EXAMPLE VII

As indicated, the partially hydrolyzed protein is well adapted to function in combination with other improving agents, to the extent of affording superior overall results, which may indeed be better than heretofore achieved with other agents alone. Thus in the following sets of baking tests, where yeast-leavened doughs were again made by the straight dough process and the resulting 1 pound baked loaves were examined and scored, i.e., for volume and texture, the known agents azodicarbonamide and potassium bromate were employed individually and also in combination with the partial hydrolysate of soya protein (produced essentially as in Example I). These tests were run respectively with patent flour and clear flour, with the following results:

(a) Patent Flour

| Treatment Level Azodicarbonamide | Bromate | Soya Hydrolysate | Volume | Ratio | Score |
|---|---|---|---|---|---|
| 5 ppm | — | — | 2585 ml | 5.65 | 94.5 |
| — | — | 100 ppm | 2540 ml | 5.56 | 95.5 |
| 5 ppm | — | 100 ppm | 2600 ml | 5.70 | 96.0 |

(b) Clear Flour

| | | | | | |
|---|---|---|---|---|---|
| — | — | 500 ppm | 845 ml | 5.98 | 94.5 |
| — | 6 ppm | — | 860 ml | 6.09 | 95.0 |
| — | 6 ppm | 500 ppm | 940 ml | 6.61 | 96.5 |

In each instance the combination of agents afforded greater improvement than either as used alone in the amounts noted.

Both for special advantage in compounding the agent with flour or in dough and like mixtures and for ease of handling and convenience of storage and shipment as an article of commerce, the partial hydrolysate product can be formulated with a diluent suitable for food use. Preferably this is an inert carrier material, with which the hydrolysate is uniformly admixed, and which is dry and finely pulverulent, and is harmless and free of undesirable taste effect in the production of baked goods from the treated flour or dough. It is believed that a satisfactory diluent can be readily selected from a variety of materials having these characteristics; typical examples of such materials, suitable for use with the hydrolysate, include wheat starch, corn starch, rice flour, lactose, magnesium carbonate, calcium sulfate and relatively inert phosphates such as tricalcium phosphate. Thus by proper dilution, a free-flowing stable product is obtained, with improved ease of application.

Although the diluent can be added after the hydrolysate, whether in acid or neutralized form, has been dried, a convenient operation is to add the carrier to the filtered reaction liquor before drying. The resulting liquid, including the hydrolysate in solution, can then be dried to obtain a free-flowing powder by vacuum evaporation, air drying with warm air, drum drying, or with special convenience, spray drying. The following example sets forth useful formulations, the amounts being parts by weight and the soya hydrolysate being prepared as in Example I.

EXAMPLE VIII

Improving Agent Compositions

| a. Soya hydrolysate | 5.3 parts |
|---|---|
| Magnesium carbonate | 0.6 parts |
| Corn starch | 2.7 parts |
| Tricalcium phosphate | 1.4 parts |
| b. Soya hydrolysate | 3 parts |
| Rice flour | 2 parts |
| Tricalcium phosphate | 2 parts |
| c. Soya hydrolysate | 1 part |
| Calcium sulfate | 2 parts |

Whereas acid hydrolysis with hydrochloric acid is unusually convenient, and this acid is the presently preferred reagent from the standpoint of cost and efficiency, other aqueous mineral acids can be used, as for example sulfuric or phosphoric acid. Alternatively appropriate acids are acetic, formic and lactic or indeed combinations of various acids, it being understood that in a general sense protein hydrolysis is a well known operation, particularly by acid reaction.

To achieve the unusual results of the invention, which are directly related to the partially hydrolyzed character of the product, the degree of hydrolysis is readily controllable by such factors as the length of reflux time, dilution of acid, and the ratio of acid to protein. A number of instances of satisfactory conditions are set forth herein, and it will be apparent that selection of same for any situation is a relatively simple matter and indeed easily determinable by test in every case, i.e., to achieve a desired state of partial reaction, of which a convenient analytical determination is as to the content of alpha-amino nitrogen, or alternatively, e.g., for comparison between batches derived from the same protein product, a simple titration procedure, reading in milli-equivalents (meq.) of alkali (NaOH) per gram of product.

EXAMPLE IX

In the following series of operations partial hydrolysates were produced, having, over a considerable range, different contents of alpha-amino nitrogen and different acid titration values, e.g., as resulting from a variety of selected conditions for the hydrolyzing step. The results of these experiments, here numbered for identification and all directed to a soya protein material having an actual protein content of about 50 percent, were:

| Expt. No. | Conc.(N) of HC | Reflux Time Hrs. | Ratio (Weight) of HC : Protein (=1) | meq. NaOH per 1g soya hydr. | % alpha-amino N: total N |
|---|---|---|---|---|---|
| 1) | 2 | 3 | 0.5 | 2.39 | 26.8 |
| 2) | 2 | 1 | 0.5 | 2.04 | 29.1 |
| 3) | 1 | 7 | 1.0 | 3.07 | 37.1 |
| 4) | 2 | 5 | 0.5 | 3.06 | 40.0 |
| 5) | 4 | 3 | 1.0 | 3.31 | 42.4 |
| 6) | 2 | 5 | 2.0 | 3.09 | 43.2 |
| 7) | 2 | 9 | 0.5 | 3.24 | 46.1 |
| 8) | 3.5 | 11 | 0.64 | 4.32 | 47.5 |
| 9) | 6 | 9 | 1.5 | 4.75 | 50.5 |
| 10) | 4 | 7 | 1.0 | 4.20 | 53.1 |
| 11) | 6 | 24 | 1.5 | 4.91 | 58.0 |

All of these partial hydrolysates were then tested in baking operations, with clear flour and a standard dough formula for white bread, baked as 100 gram loaves. Using the hydrolysates each in amount of 100 mg. per 100 g. of flour and each identified by the same experiment number, the results were as follows, including volume measurements and texture scores, and including control doughs without improver:

| Expt. No. | Grain & Texture Score | Ratio Vol. to Wt. | Bread Volume |
|---|---|---|---|
| Control | 93.0 | 5.2 | 735 ml |
| 1) | 96.0 | 5.60 | 800 ml |
| 2) | 94.5 | 5.50 | 780 ml |
| 3) | 95.5 | 5.80 | 830 ml |
| 4) | 97.0 | 5.92 | 855 ml |
| 5) | 95.5 | 5.88 | 840 ml |
| 6) | 95.0 | 5.88 | 850 ml |
| 7) | 96.0 | 6.03 | 870 ml |
| 8) | 95.5 | 5.66 | 805 ml |
| 9) | 96.0 | 5.82 | 840 ml |
| 10) | 95.5 | 5.85 | 835 ml |
| 11) | 94.5 | 5.86 | 830 ml |

Effective maturing or improving activity was thus achieved when the hydrolysis was carried to a point where the ratio of alpha-amino nitrogen to total nitrogen was at least about 26 percent, or more preferably was greater than 26 percent, e.g., about 27 percent or above. The tests of the next example (below) afford evidence of the upper limit of partial hydrolysis for good improving action, and also indicate that at complete hydrolysis essentially no useful maturing or improving function is attained.

EXAMPLE X

Using batches of the same soya protein material as above, two hydrolysates were produced, under circumstances and with assay results as indicated in the following tabular manner:

(a) Complete Hydrolysis to Amino Acids
Soya Protein
6N HCl
Acid : Protein Ratio (by wt.) was 500 : 1
Sealed Tube
Heated 24 Hours at 105–110° C.
Alpha-Amino N : Total N was approximately 67%
(b) Less Than Complete Hydrolysis
Soya Protein
6N HCl
Acid : Protein Ratio (by wt.) was 1.5 : 1
Sealed Tube
24 Hours at 105°–110° C.
Alpha-Amino N : Total N was 62.4%

These hydrolysates being the complete hydrolysate (a) and the partial hydrolysate (b) were then used, each at two treatment levels per 100 g. of flour, in baking tests with standard dough mixtures to produce small test loaves. The results were as follows:

| Product | Treatment Level | Maturing Effect |
|---|---|---|
| (a) Complete Hydrolysis | 150 mg/100 g | Slight |
| | 200 mg/100 g | Slight |
| (b) Incomplete Hydrolysis | 150 mg/100 g | Good |
| | 200 mg/100 g | Good (i.e., |

It is evident that hydrolysis to an upper limit of an alpha-amino nitrogen : total nitrogen value of about 62 percent, or less than about 63 percent, is representative of useful improving function, whereas complete hydrolysis destroys most of the activity. This upper limit can alternatively be expressed in relation to the alpha-amino nitrogen content achieved upon complete hydrolysis of the protein used. More particularly, the desired product is characterized by a content of alpha-amino nitrogen, measured in percentage of total nitrogen in the product, which is less by at least several percent i.e., about 4 percent) of such total nitrogen than the percent alpha-amino N : total N attained by complete hydrolysis of the protein. These measurements, of course, are considered with respect to the actual hydrolysate product, after filtration and drying but before neutralization, or at least before any neutralization with ammonium hydroxide. It is understood that in the usual commercial soya protein, available at relatively low cost, the non-protein, available at relatively low cost, the non-protein material which survives in the dissolved hydrolysate liquor, is essentially carbohydrate or the like, i.e., non-nitrogenous.

A further mode of defining the extent of partial hydrolysis of a protein, and thus of defining the hydrolysate agent of the invention, is that the water-soluble hydrolysate product, produced by the stated treatment, is characterized by a content of alpha-amino nitrogen which is more than 35 percent and less than 95 percent (or preferably in a range of about 40 to about 93 percent) of the content of such nitrogen in the water-soluble hydrolysate material that would be obtained, i.e., that is attainable, from the same starting protein material by complete hydrolysis. As indicated above, unhydrolyzed protein, and likewise the result of hydrolysis appreciably below the lower limits mentioned above, shows no significant improving activity.

Proteins are understood to consist of long chains of what are essentially amino acid residues successively linked by so-called peptide bonds, each chain usually comprising the residues of rather a large number of different amino acids, and the actual protein sometimes involving cross-linkages between chains or between remotely spaced localities of a single chain, e.g., between cystine-type residues. As hydrolyzing reaction proceeds there is understood to be a progressive breaking of the peptide linkages, ultimately yielding a complete conversion of the protein chains into separate amino acids. To the extent that hydrolysis is only partial, at least some of the peptide linkages remain while at least some free amino acids are probably liberated, but the structure of the composition is difficult to determine.

It may be explained that where the analyzed alpha-amino nitrogen in the partial hydrolysate is compared with the total nitrogen content and the desired incompleteness of hydrolysis is in effect measured against the value of the ratio for complete reaction (e.g., the value of 67 percent mentioned above), the remaining nitrogen which occurs in the completely hydrolyzed product and which therefore cannot become alpha-amino nitrogen by hydrolysis is accounted for by additional nitrogen located elsewhere than at a potential alpha location, or heterocyclic nitrogen, or other nitrogen which is not in a primary amine grouping. For instance, proline is an amino acid that has a heterocyclic-linked nitrogen which in effect corresponds to the alpha-amino nitrogen of most amino acids but which is not found, on analysis, as alpha-amino nitrogen. While in a strict sense the determination of alpha-amino nitrogen thus does not necessarily measure the entire amino acid conversion, the nature and circumstances of the proteins are such that analysis for alpha-amino nitrogen is a reasonably accurate indicator of the extent of hydrolysis, especially for the purposes of the present invention.

Baking tests were run with a large number of separately available amino acids to ascertain whether any of them (e.g., if released by the partial hydrolysis) might be responsible for the unusual effects noted. Thus doughs were made and bread baked for each of the following amino acids, i.e., respectively incorporated, alone, in the dough:

> Glutamic Acid
> Proline
> Leucine
> Threonine
> Phenyl alanine
> Tyrosine
> Serine
> Valine
> Tryptophane
> Glycine
> Glutamine
> Methionine
> Sarcosine In each instance several tests were made with the selected substance, at different levels of treatment over a range; the range for glutamic acid was 5 to 70 ppm (on the flour), for proline 5 to 100 ppm and for each of the others 5 to 50 ppm. In no case was there any truly significant improvement noted in the bread, e.g., as compared with an untreated control. At the highest level (50 ppm) leucine, phenyl alanine and sarcosine each evidenced some slight or very limited improvement of the bread, and likewise glutamic acid at 70 ppm, but not really approaching the substantial maturing or like activity achieved with the partial hydrolysate of a total protein.

A mixture was made consisting, by weight, of 70 percent glutamic acid, 20 percent proline and 10 percent $NH_4Cl$, to evaluate one hypothesis that such a mixture might be significantly present in the partial gluten hydrolysate. This mixture was tested in bread doughs at flour treatment levels of 200 to 2,000 ppm, but no improving action comparable to the invention was noted, there being no more than a small effect and then only at levels above 1,000 ppm.

Since cystine, an amino acid, is known to have maturing activity, it might perhaps be considered that a possible cystine content in the partial hydrolysate would be a significant factor. The cystine residue concentration in soya protein is approximately 0.5 percent so that in using the partial hydrolysate at a treatment level of 25 to 150 mg. per 100 g. flour (250 to 1,500 ppm), the maximum cystine that could be present (if it were there at all) would be about one to seven ppm. Tests indicated, however, that cystine does not exhibit significant maturing activity at these levels, but on the contrary must be utilized at a treatment level of at least about 30 ppm to show useful improving function.

From all of the evidence it becomes clear that the partial nature of the hydrolysis is critical for the improving agent of the invention, and may be measured by the content of alpha-amino nitrogen as compared, either directly or in effect, with such nitrogen in a fully hydrolyzed product, and of course also with the relatively insignificant amount of such nitrogen in the original protein. Within the limits given above, best and indeed unusually effective results have been achieved where the ratio of alpha-amino nitrogen to total nitrogen has been in the range of about 26 to about 58 percent, or stated in other words, where the content of alpha-amino nitrogen is in the range of about 40 to about 87 percent of the amino nitrogen found when the protein is hydrolyzed to the end point, i.e., considered to be completed hydrolysis.

In some chromatographic studies made with the partial hydrolysate of the invention it was noted that those bands of the product which displayed flour or dough improving activity revealed no cystine or like sulfur-containing amino acid. There thus appears to be evidence that in the partial hydrolysate, cystine residues remain in peptide-bonded state rather than being liberated as amino acid. While this may conceivably indicate that the peptide-linked fraction in which the cystine (or cysteine) residues remain is more active, for example, than cystine itself, these findings may at least represent an alternative mode of identifying the desired product, bearing in mind that proteins generally contain some cystine-producing residues. That is to say, the product would appear to be one which contains cystine-producing residues but which is characterized in that such residues remain substantially in peptide-bonded state, —i.e., an indicium of the product, whether or not this characterization is functionally significant.

While test has indicated that alternative modes of hydrolysis, as for example enzymatic hydrolysis (which is a relatively very slow operation), may be employed, acid hydrolysis as by utilizing hydrochloric acid under reflux conditions has been noted above as especially desirable for making the partial hydrolysate. The invention, moreover, is of particular advantage in connection with, and thus may in one specific sense be defined as related to, the production of ordinary bread, i.e., yeast-leavened white bread, from wheat flour. Unless otherwise specified, the term bread is used to include products such as rolls of closely similar character, and references to yeast-leavening mean that yeast is employed for its conventional function, whether solely by fermentation in sponge or straight dough mixtures, or by use of a yeast-containing, yeast-fermented broth (sometimes called a brew or ferment), which includes products of fermentation activity and also retains active yeast for further fermentation function, e.g., during proofing.

Some small increase in the improving function of the partial hydrolysate is found when the protein source material has been preliminarily treated with substances heretofore known as flour maturing or oxidizing agents, or conditioning agents. Thus for instance such improvement has been noted where the soya protein material, e.g., containing 50 percent protein and sometimes identified as soya flour, is first subjected to a treatment of the nature of that utilized for ordinary flour, with one or another of the following substances: chlorine dioxide, ozone, chlorine, potassium bromate, and potassium iodate, and chlorine and potassium bromate used successively; another treatment being with urea or sulfur dioxide (which are dough conditioners) followed by treatment with one of the oxidizing agents. In each instance the treated protein was then subjected to partial hydrolysis to yield a product that was used in baking tests. Like enhancement of activity has been noted where the partial hydrolysate after preparation, is treated with chlorine dioxide or hydrogen peroxide. Advantage in cooperative use of the partial hydrolysate with other agents has been confirmed in the case of partial hydrolysate of gluten, e.g., employing potassium bromate or potassium iodate.

In another test useful results were obtained where wheat flour was treated with chlorine dioxide, and then the gluten was washed out and subjected to partial hydrolysis. A similar operation involved making yeast raised dough with potassium bromate and then separating the gluten and using it to make a partial hydrolysate. As will be appreciated, there can be multiple preliminary treatments, again with some minor advantage, as for example in first treating wheat flour with chlorine dioxide, separating the gluten, treating the latter with potassium iodate and thereafter partially hydrolyzing the so-treated gluten.

In addition to improvement in bread volume and the factors examined for texture score, it has been found that the present agents, notably made in the optimum range of partial hydrolysis, yield a softening of the bread, e.g., an improvement in softness which may be of the order of 20 percent. Thus for example in one set of tests to make loaves of white bread by the standard straight dough method, comparison was made between a control employing no improver and a partial hydrolysate of soya protein that was produced by refluxing for 5 hours with 2-normal hydrochloric acid at a ratio of hydrochloric acid to protein of about 0.5 : 1. The partial hydrolysate was mixed with the dough in moderately high concentration, e.g., 500 ppm. The resulting bread was tested with a Baker compressimeter, being a standard instrument employed in the baking industry to test bread softness, and the resulting readings of compressibility force after 1 day and 3 days following baking, were as follows:

| Additive | Compressibility Force | |
|---|---|---|
| | 1 day | 3 days |
| None (control) | 12.7 g | 18.7 g |
| Soya hydrolysate | 10.1 g | 16.6 g |

The compressimeter was used conventionally, with loading to achieve a penetration depth of two centimeters, the instrument being set at disc position No. 2. As will be seen, the bread from treated dough showed a 20 percent improvement in softness (i.e., less force required) after 1 day, the improvement persisting at a level of 12 percent after 3 days.

While the invention is most importantly related to improving action on bread formulas, that are usually derived from hard wheats, further tests have indicated that the improver is also useful for cake flours which invariably come from soft wheats, the agent thus having a generality of action which is unusual in that an improver for one type of flour is, from experience, not necessarily effective for the other type.

EXAMPLE XI

In one test, a standard cake formulation was employed, using conventional non-yeast leavening agent, and a product of the nature of layer cake was baked. Examination and interpretation of the results, for the variety of properties noted below, was in accordance with the standard scoring system set forth in *Cereal Laboratory Methods*, Sixth Edition, 1957 (American Association of Cereal Chemists, Inc.) In particular: a control was run using flour which had received chlorine treatment, as conventionally appropriate for cake flour, and the significant batter utilized the same chlorine-treated flour, made up in the cake formulation with 33 milligrams of partial hydrolysate of soya protein (see Example I) per 100 grams of flour. The results were as follows:

ployed. Normally, amounts upwards of 25 ppm of protein-derived hydrolysate are preferred, very useful results being achieved with 50 to 100 ppm of soya partial hydrolysate (i.e., considered as the hydrolysate content of the above soya product), although somewhat larger quantities (e.g., of the order of several hundred ppm and above) are recommended for continuous mixing. As has been stated, rather large excesses can be tolerated without losing the improving action or physically deteriorating the dough. Ordinarily it is unnecessary to use more than 500 ppm, or at most about 1,250 ppm (being respectively 1,000 and 2,500 ppm of the exemplified soya product), and it is preferable to avoid circumstances, e.g., as with substantially larger amounts or otherwise, where or if the hydrolysate may tend to impart a definite flavoring effect which would be unsuitable in bread or the like.

In preparing hydrolysate compositions with solid diluent, the latter should be sufficient to counteract the hygroscopic nature of the hydrolysate, i.e., to provide an essentially non-hygroscopic and free-flowing material. Ordinarily this requires an amount of diluent equal to at least about one-half the amount of actual hydrolysate (or one-third of the soya hydrolysate material described in the examples); in general the diluent may conveniently be in the range of three to ten times the actual partial hydrolysate present, although circumstances may permit much larger amounts, e.g., up to one hundred times. It may be noted that in partial hydrolysates prepared from commercial protein products, such as the soya protein of the examples, the non-active material carried over from the original protein product appears insufficient or ineffective to avoid the hygroscopic effects which the diluent serves to overcome, as stated.

It is to be understood that the invention is not limited to the specific operations and substances hereinabove set forth but

| Treatment | Vol. ml. | Spec. vol. | Symmetry | Crust | Tenderness | Silkiness | Grain | Crumb color | Flavor |
|---|---|---|---|---|---|---|---|---|---|
| Flour plus chlorine | 675 | 2.37 | 11 | 3 | 9 | 10 | 18 | 10 | 6 |
| Flour plus chlorine plus soya hydrolysate | 710 | 2.52 | 13 | 3 | 11 | 12 | 20 | 11 | 7 |

Useful improvement in a variety of respects is indicated by this test.

It was further noted that the doughs, such as bread doughs, made with the partial hydrolysate exhibited better handling properties, with respect to ease of operation in dividing, rounding and other manipulation. By all of the above and other testing, the procedures and compositions utilizing the partial hydrolysate have been shown to achieve abundantly the totality of flour or dough improving functions herein set forth, thus demonstrating that the hydrolysate constitutes an effective, economical improving agent, which is of non-chemical type, derived from natural material.

Reference in the examples and elsewhere above to amounts or concentrations of partial hydrolysate product have been directed to the products derived by partial hydrolysis of the stated protein materials, so that for example in the case of the soya hydrolysate where the material treated included other substances, the product specified by numerical quantities represented about a 50 percent actual content of protein-derived partial hydrolysate itself. In the appended claims, however, amounts of partial hydrolysate are stated with respect to such protein-derived hydrolysate itself, unless otherwise indicated. In general, moreover, it is found that the quantity of such actual hydrolysate required to produce an appreciable effect of at least some use, is in the range of 10 ppm (on the flour) and upwards, meaning 20 ppm and upwards, for instance, of the soya hydrolysate product of the examples. Ordinarily somewhat larger amounts will be used, and indeed may be found requisite for notable results; as will be understood, it is a relatively simple matter of baking test to determine the proportion of a given hydrolysate for desired effect under given circumstances such as the kind of flour, the type of mixing and baking, and the kind of source protein emmay be carried out in other ways without departure from its spirit.

I claim:

1. A process of treating flour to improve it for making baked products having improved physical properties, comprising admixing with the flour an improvement-producing amount of a protein hydrolysate product produced by partial hydrolysis of edible protein and characterized by a content of alpha-amino nitrogen, measured in percentage of the total nitrogen in said product, which is in the range of about 26 to about 63 percent.

2. A process as defined in claim 1, in which the edible protein comprises soya protein.

3. A process as defined in claim 1, in which the edible protein comprises gluten.

4. A process as defined in claim 1, in which the protein hydrolysate product comprises a mixture of partial hydrolysates of soya protein and gluten.

5. A process as defined in claim 1, in which the edible protein consists essentially of soya protein and the content of alpha-amino nitrogen in the hydrolysate product, measured as aforesaid, is in the range of about 26 to about 58 percent.

6. A process as defined in claim 1, wherein said hydrolysate product is admixed with the flour by mixing said product into a water-containing formulation that contains the flour and that is prepared for making a leavened baked product.

7. A process as defined in claim 1, wherein the hydrolysate product is admixed with the flour by mixing said product into a water-containing bread dough mixture that contains the flour.

8. A process as defined in claim 7, in which the edible protein consists essentially of soya protein and the said amount of said product is sufficient to provide a quantity of protein-derived material relative to the flour in the range extending upward from about 10 parts per million.

9. A process as defined in claim 8, in which the content of alpha-amino nitrogen, measured as aforesaid, is in the range of about 26 to about 58 percent.

10. A process of making dough for baked products having improved physical properties which comprises adding to and admixing with the dough ingredients, including flour and water, an improvement-producing amount of a protein hydrolysate product produced by partial hydrolysis of edible protein and characterized by a content of alpha-amino nitrogen, measured in percentage of the total nitrogen in said product, which is in the range of about 26 to about 63 percent.

11. A process as defined in claim 10, which is for making dough for yeast-leavened white bread, and includes mixing together the dough ingredients of which the flour is white flour and which include yeast, said amount of said hydrolysate product being sufficient to provide a quantity of protein-derived material relative to the flour, in the range extending upward from about 10 parts per million.

12. A process as defined in claim 11, in which said protein comprises soya protein.

13. A process as defined in claim 12, in which said hydrolysis of the protein is acid hydrolysis effected with hydrochloric acid.

14. A process as defined in claim 13, in which said hydrolysate product is in neutralized form derived by neutralizing the material that results from said acid hydrolysis with ammonia.

15. A process as defined in claim 12, in which said hydrolysate product is admixed in the dough in an amount to provide protein-derived material in the range of 25 to 1,000 parts per million of flour for substantially improving the dough.

16. A process of treating flour to improve it for making baked products having improved physical properties, comprising admixing with the flour, a protein hydrolysate product produced by partial hydrolysis of edible protein and characterized by a content of alpha-amino nitrogen, measured in percentage of the total nitrogen in said product, which is at least about 26 percent and is less by at least several percent of said total nitrogen than the percent alpha-amino nitrogen attained by complete hydrolysis of said edible protein, the amount of said product relative to the flour being a quantity, in the range extending upward from about 10 parts per million, which is suitable for improving action with the flour.

17. A process as defined in claim 16, wherein the hydrolysate product is admixed with the flour by mixing said product into a mixture to be baked that contains water and the flour.

18. A process as defined in claim 16, wherein the hydrolysate product is admixed with the flour by mixing said product into a water-containing bread dough mixture that contains the flour and that contains yeast, for making bread.

19. A process of treating flour to improve it for making baked products having improved physical properties, comprising admixing with the flour a protein hydrolysate product produced by partial hydrolysis of edible protein which contains cystine-producing residues, said hydrolysate product being characterized by a content of alpha-amino nitrogen which is between 35 percent and 95 percent of the alpha-amino nitrogen attained by complete hydrolysis of said edible protein, said hydrolysate product containing said cystine-producing residues in peptide-bonded state rather than as cystine, the amount of said product being sufficient to provide a quantity of protein-derived material relative to the flour, in the range extending upward from about 10 parts per million, which is suitable for improving action with the flour.

20. In the process of making yeast-leavened white bread which comprises preparing dough for said bread by mixing together bread dough ingredients including white wheat flour, yeast and water, and baking said dough, the improvement comprising admixing with the flour a protein hydrolysate product produced by partial hydrolysis of edible protein, said hydrolysate product being admixed in an amount which is suitable for improving action with the flour and said hydrolysate product being characterized by a content of alpha-amino nitrogen, measured in percentage of the total nitrogen in said product, which is in the range of 26 to 63 percent.

* * * * *